(12) United States Patent
Dai et al.

(10) Patent No.: US 8,338,006 B2
(45) Date of Patent: Dec. 25, 2012

(54) MAGNETIC RECORDING DISK HAVING PRE-PATTERNED SURFACE FEATURES AND PLANARIZED SURFACE

(75) Inventors: Qing Dai, San Jose, CA (US); Xing-Cai Guo, Tracy, CA (US); Dan Saylor Kercher, Santa Cruz, CA (US); Mike Suk, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 712 days.

(21) Appl. No.: 12/136,640

(22) Filed: Jun. 10, 2008

(65) Prior Publication Data
US 2009/0305081 A1    Dec. 10, 2009

(51) Int. Cl.
G11B 5/65    (2006.01)
(52) U.S. Cl. ....................................... 428/833.4
(58) Field of Classification Search .............. 428/846, 428/848, 848.1, 848.5, 833, 833.3, 833.4, 428/835.8, 841.3, 843.5
See application file for complete search history.

(56) References Cited

U.S. PATENT DOCUMENTS

| | | | |
|---|---|---|---|
| 4,912,585 A | 3/1990 | Belser et al. | |
| 6,673,429 B1 * | 1/2004 | Ma et al. | 428/833.6 |
| 6,680,079 B1 * | 1/2004 | Stirniman et al. | 427/130 |
| 6,770,388 B2 * | 8/2004 | Uwazumi et al. | 428/829 |
| 2007/0003793 A1 * | 1/2007 | Sakurai et al. | 428/826 |

FOREIGN PATENT DOCUMENTS

JP    2004030888    1/2004

OTHER PUBLICATIONS

Bandic et al., "Patterned magnetic media: impact of nanoscale patterning on hard disk drives", Solid State Technology S7+ Suppl. S, Sep. 2006.
Terris et al., "Topical Review: Nanofabricated and self-assembled magnetic structures as data storage media", J. Phys. D: Appl. Phys. 38 (2005) R199-R222.

* cited by examiner

*Primary Examiner* — Holly Rickman
*Assistant Examiner* — Lisa Chau
(74) *Attorney, Agent, or Firm* — Thomas R. Berthold

(57) ABSTRACT

A method for planarizing a magnetic recording disk that has surface features of elevated lands and recessed grooves includes forming two coatings of cured perfluorinated polyether (PFPE) polymers over the surface features. The disk may have a protective carbon overcoat with a surface that replicates the topography of lands and grooves. A liquid functionalized-PFPE is applied over the disk surface and then cured to form a first coating with the functionalized end groups bonding to the carbon overcoat. A liquid non-functionalized-PFPE polymer is then applied over the functionalized-PFPE coating and cured to form a second coating. The combined coatings substantially planarize the disk surface so that there is minimal recession between the top of the coating over the lands and the top of the coating over the grooves.

5 Claims, 5 Drawing Sheets

MAGNETIC RECORDING DISK HAVING PRE-PATTERNED SURFACE FEATURES AND PLANARIZED SURFACE

BACKGROUND OF THE INVENTION

1. Field of the Invention

This invention relates generally to a magnetic recording disk with pre-patterned surface features of elevated lands and recessed grooves, and more particularly to a method for planarizing the disk surface.

2. Description of the Related Art

Conventional magnetic recording hard disk drives use either horizontal recording wherein the magnetized regions that define the magnetically recorded data bits are oriented in the plane of the recording layer on the hard disks, or perpendicular recording wherein the magnetized regions are oriented perpendicular to the plane of the recording layer. The conventional disk is a "continuous-media" (CM) disk wherein the recording layer is a continuous layer of magnetic material that becomes formed into concentric data tracks containing the magnetically recorded data bits when the write head writes on the magnetic material. The recording layer also includes a pre-recorded pattern of servo sectors that cannot be written over by the write heads and that are used to position the read/write heads to the desired data tracks and maintain the heads on the data tracks during reading and writing. The conventional CM disk has a protective overcoat, typically formed of amorphous carbon, that covers the recording layer and provides a generally smooth planar surface with no surface features. The read/write heads are located on air-bearing sliders that are supported above the smooth disk surface on a thin film of air or "air-bearing" as the disk rotates.

A variation of a CM disk is a "discrete-track media" (DTM) disk, meaning that the concentric data tracks of continuous magnetic material are radially separated from one another by concentric nonmagnetic guard bands. DTM disks are known in the art, as described for example in U.S. Pat. No. 4,912,585. In a DTM disk, the data tracks are typically elevated lands that contain magnetic material and the nonmagnetic guard bands are trenches or grooves that are recessed below the elevated lands. The nonmagnetic guard bands are either formed of nonmagnetic material or contain magnetic material but are recessed far enough below the elevated data tracks to not adversely the readback signals from the data tracks.

In addition to CM disks and DTM disks, magnetic recording disks with "bit-patterned media" (BPM) have been proposed to increase the data density. In BPM disks, the magnetizable material on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional CM disks wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In one type of BPM disk, the data islands are elevated, spaced-apart pillars that are separated by nonmagnetic trenches or recesses.

CM disks, DTM disks and BPM disks all require servo sectors that are angularly spaced around the disk and extend generally radially across the concentric data tracks. The servo sectors are pre-recorded patterns that cannot be written over by the write heads and that are used to position the read/write heads to the desired data tracks and maintain the heads on the data tracks during reading and writing. In both DTM disks and BPM disks, the servo sectors may be patterns of elevated servo blocks separated by nonmagnetic trenches or recesses. However, CM disks can also be fabricated with servo sectors of elevated servo blocks separated by nonmagnetic trenches or recesses. Thus CM disks, DTM disks and BPM disks may all have pre-patterned surface features of elevated lands and recessed grooves.

There are several methods for fabricating disks with surface features of elevated lands and recessed grooves. In one approach, particularly applicable for BPM disks, the disks are produced by replication from a mold via nanoimprinting. The nanoimprinting process forms not only the isolated data islands in the data tracks, but also the servo blocks in the servo sectors. In nanoimprinting, a mold or template replicates a topographic pattern of surface features onto a polymeric resist coating on the disk substrate. The disk substrate may have a dielectric coating, such as a silicon nitride film. The nanoimprinted resist pattern is then used as a mask for etching the pattern into the silicon nitride film with a fluorine plasma. After etching the silicon nitride, the resist is removed. Magnetic material is then sputter deposited over the lands and grooves. The grooves may be recessed far enough from the read/write heads to not adversely affect reading or writing, or they may be "poisoned" with a dopant material to render them nonmagnetic. Nanoimprinting of BPM disks is described by Bandic et al., "Patterned magnetic media: impact of nanoscale patterning on hard disk drives", *Solid State Technology* S7+ *Suppl. S, September* 2006; and by Terris et al., "TOPICAL REVIEW: Nanofabricated and self-assembled magnetic structures as data storage media", *J. Phys. D: Appl. Phys.* 38 (2005) R199-R222.

For disks with pre-patterned surface features of elevated lands and recessed grooves there is need to planarize the surface topography so that the slider is maintained at a relatively constant "fly height" by the air-bearing generated by the rotating disk. U.S. Pat. No. 6,680,079 B2 describes a method of planarizing a disk surface by applying a perfluorinated polyether (PFPE) polymer with a functional acrylate end group, and then curing the polymer to cross-link it and bond it to the protective disk overcoat. However, this method appears to be applicable only to disks with relatively small variations in surface topography. With larger topography variations (in the range of about 10 nm or above), undesirable recession of the polymer in the grooves occurs after curing. Thus, for disks with relatively large variations in surface topography, such as DTM disks and disks with pre-patterned servo blocks, a large variation in surface topography still remains after planarization by this method.

What is needed is a method for planarizing the surface of a magnetic recording disk that has pre-patterned surface features of elevated lands and recessed grooves where there is a relatively large variation in the surface topography.

SUMMARY OF THE INVENTION

The invention relates to a method for planarizing a magnetic recording disk that has surface features of elevated lands and recessed grooves. The disk may have a protective carbon overcoat with a surface that replicates the topography of lands and grooves. A liquid functionalized perfluorinated polyether (PFPE) polymer is applied over the disk surface and then cured to form a first coating with the functionalized end groups bonding to the carbon overcoat and interlinked with each other. A liquid non-functionalized-PFPE polymer is then applied over the functionalized-PFPE coating and cured to form a second coating. The combined coatings substantially planarize the disk surface so that there is minimal recession between the top of the coating over the lands and the top of the coating over the grooves. In one embodiment the functionalized-PFPE polymer may have functional acrylate end groups. The non-functionalized-PFPE polymer may have high molecular weight to reduce spin-off due to disk rotation. As an optional step, the disk can be subjected to a well-known tape burnishing or wiping process after application of the functionalized-PFPE to remove excess accumulation of the functionalized-PFPE on top of the lands.

The method has application to planarizing any type of magnetic recording disk with surface features of elevated lands and recessed grooves, including a CM disk, a DTM disk, or a BPM disk, all of which may have servo sectors with such surfaces features.

The invention also relates to a planarized magnetic recording disk having a carbon-containing protective overcoat on the elevated lands and recessed grooves and a coating on the overcoat formed of a cross-linked functionalized-PFPE and a cross-linked non-functionalized-PFPE on the functionalized-PFPE. The disk has recession of the planarized surface below a specified minimum value despite the presence of grooves with a gap depth greater than a specified value.

For a fuller understanding of the nature and advantages of the present invention, reference should be made to the following detailed description taken together with the accompanying figures.

DETAILED DESCRIPTION OF THE INVENTION

Figure 1:
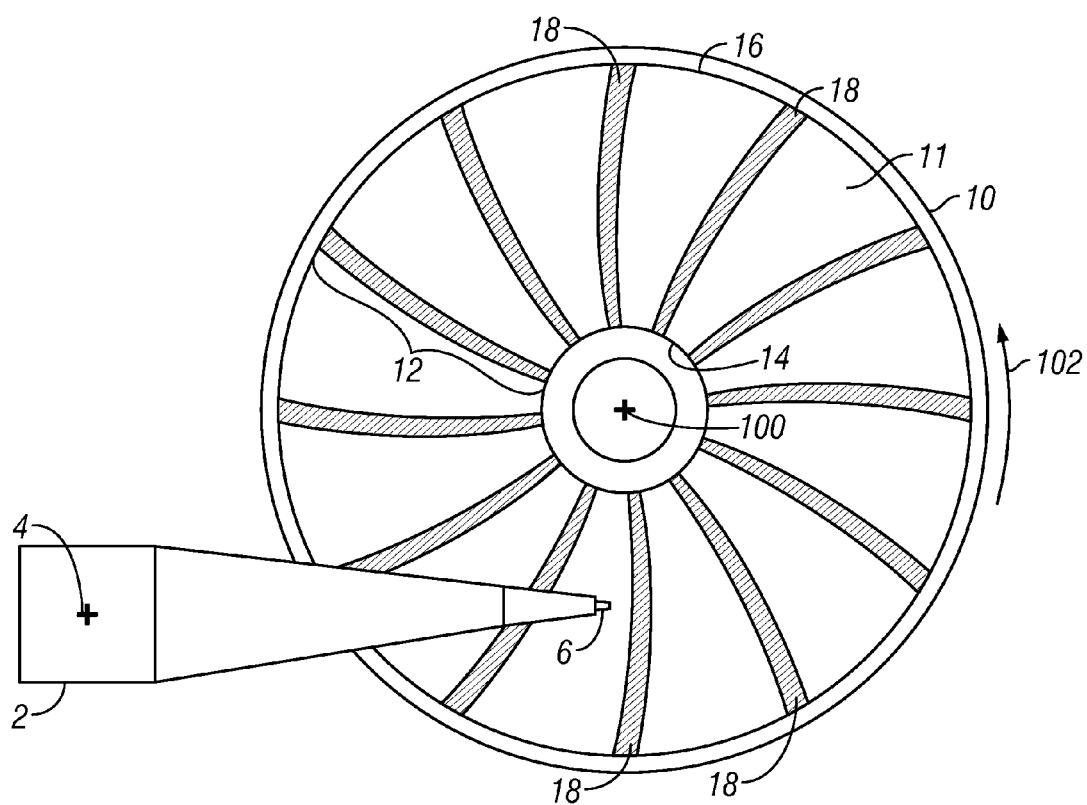
FIG. 1 is a schematic of a disk drive with a rotary actuator and a rigid magnetic recording disk having pre-patterned servo sectors.

FIG. 1 illustrates a disk drive with a rotary actuator 2 and a rigid magnetic recording disk 10 having pre-patterned surface features formed on surface 11. The surface features include at least pre-patterned servo blocks in angularly-spaced servo sectors 18. The disk 10 rotates in the direction 102 about a central axis 100. The surface 11 has an annular data band 12 which is defined by an inside diameter (ID) 14 and an outside diameter (OD) 16. The portions of the data band between the servo sectors 18 are used for the storage of user data and contain circular data tracks, with each data track being typically divided into physical data sectors. The disk 10 may be a CM disk, in which case the circular data tracks are formed by the write head on a continuous recording layer. The disk 10 may also be a DTM disk, in which case the circular data tracks are discrete radially-spaced elevated tracks separated by recessed guard bands, with the elevated tracks and recessed guard bands forming surface features in addition to the servo blocks in servo sectors 18. The disk 10 may also be a BPM disk, in which case the circular data tracks contain discrete elevated data islands separated by recesses, with the elevated islands and recesses forming surface features in addition to the servo blocks in servo sectors 18. The rotary actuator 2 rotates about pivot 4 and supports a read/write head 6 at its end. As the actuator 2 rotates, the head 6 follows a generally arcuate path between ID 14 and OD 16.

The servo sectors 18, and the discrete elevated tracks if the disk is a DTM disk or the discrete elevated data islands if the disk is a BPM disk, may be formed by a patterning process using a master template. In a nanoimprinting process, a master template replicates a topographic pattern onto a polymeric resist coating on the disk substrate, the resist pattern is transferred into the disk substrate with an etching process, and then magnetic material is sputter deposited over the pattern. The servo sectors 18 form a pattern of angularly spaced arcuate lines that extend generally radially from ID 14 to OD 16. The arcuate shape of the servo sectors matches the arcuate path of head 6. During operation of the disk drive, the head 6 reads or writes data on a selected one of a number of concentric circular data tracks located between the ID 14 and OD 16 of the annular data band 12. To accurately read or write data from a selected track, the head 6 is required to be maintained over the centerline of the track. Accordingly, each time one of the servo sectors 18 passes beneath the head 6, the head 6 detects discrete magnetized servo blocks in the position error signal (PES) field in the servo sector. A PES is generated and used by the disk drive's head positioning control system to move the head 6 towards the track centerline. Thus, during a complete rotation of the disk 10, the head 6 is continually maintained over the track centerline by servo information from the servo blocks in successive angularly spaced servo sectors 18.

Figure 2A:
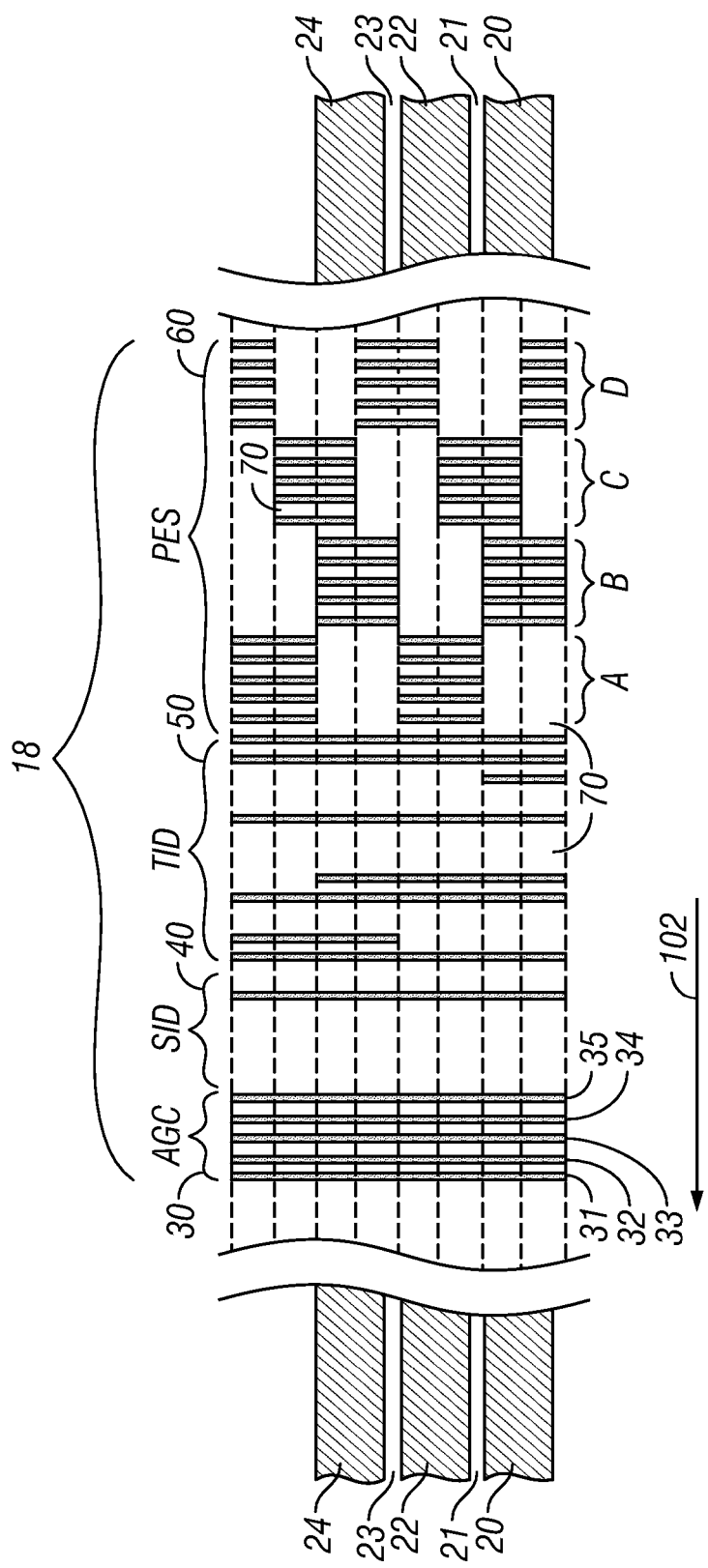
FIG. 2A is a schematic of a top view of a discrete-track media (DTM) disk and shows a typical servo sector with elevated servo blocks and portions of three elevated data tracks separated by recessed guard bands.

FIG. 2A is an expanded top view of disk 10 where the disk is a DTM disk and shows a typical servo sector 18 and portions of three DTM data tracks 20, 22, 24. Three discrete elevated data tracks 20, 22, 24 and two recessed guard bands 21, 23 are shown. All of the shaded portions of servo sector 18 represent discrete elevated servo blocks magnetized in the same direction. They may all be magnetized in the same direction horizontally, i.e., in the plane parallel to the plane of the paper in FIG. 2A, if the disk drive is designed for longitudinal or horizontal magnetic recording, or perpendicularly, i.e., into or out of the plane of the paper, if the disk drive is for perpendicular magnetic recording. It is also possible that every other shaded region in FIG. 2A might have opposite polarity, with the non-shaded regions 70 being nonmagnetic, which improves the signal quality of the servo pattern, as described in U.S. Pat. No. 7,236,325 B2 which is assigned to the same assignee as this application. The non-shaded regions 70 in servo sector 18 represent nonmagnetic regions that are recessed from the elevated servo blocks. Each discrete servo block is a magnetized block separated from other servo blocks by nonmagnetic regions 70. The term "nonmagnetic" means that the regions 70 between the servo blocks are recesses that contain a nonferromagnetic material, such as a dielectric, or a material that has no substantial remanent moment in the absence of an applied magnetic field, or a ferromagnetic material that is recessed far enough below the elevated servo blocks to not adversely affect reading or writing. The nonmagnetic regions 70 may also be recessed grooves or troughs in the magnetic recording layer or disk substrate that contain no ferromagnetic material.

The servo blocks that make up servo sector 18 are arranged in fields 30, 40, 50 and 60, as shown in FIG. 2A. Servo field 30 is an automatic gain control (AGC) field of blocks 31-35 that are used to measure the amplitude of the signal and adjust the gain for the subsequently read servo blocks. Servo field 40 is sector identification (SID) field, also called a servo timing mark or STM field, to provide a timing mark to establish start/stop timing windows for subsequent servo blocks. Servo field 50 is a track identification (TID), also called the cylinder or CYL field because the tracks from all of the disk surfaces in a disk drive with a multiple stacked disks from a "cylinder" of tracks. The TID field 50 contains the track number, typically Gray-coded, and determines the integer part of the radial position. Servo field 60 is the position error signal (PES) field, which in this example contain A, B, C, D subfields of servo blocks as part of the well-known "quad-burst" PES pattern, and are used to determine the fractional part of the radial position.

Figure 2B:
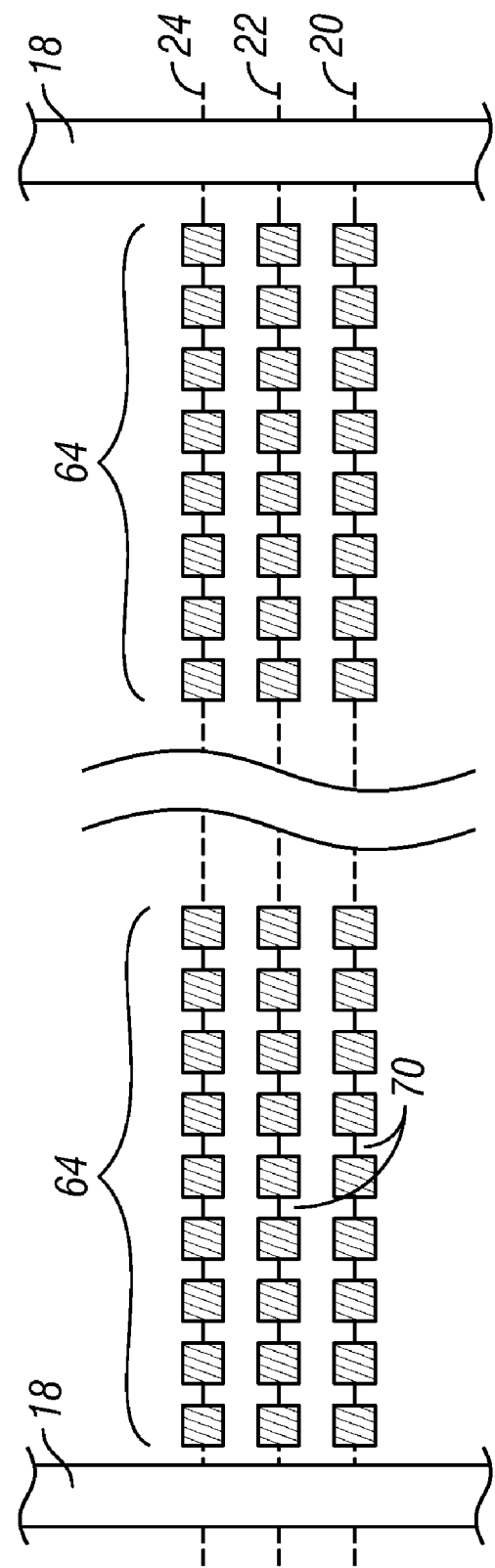
FIG. 2B is a schematic of a top view of a portion of a bit-patterned media (BPM) disk and shows three data tracks each containing discrete isolated data islands separated by recessed nonmagnetic regions.

FIG. 2B is a schematic illustration of a top view of a portion of disk 10 where the disk is a BPM disk. The three data tracks 20, 22, 24 each contain discrete isolated data islands 164 and are shown with two successive servo sectors 18 that extend generally radially across the concentric data tracks 20, 22, 24. Like the servo blocks in servo sector 18 (FIG. 2A), each data track 20, 22, 24 contains discrete elevated spaced-apart islands of magnetic material that are separated from other islands by recessed nonmagnetic regions 70. The BPM disk shown in FIG. 2B thus contains surface features of elevated lands and recessed grooves not only in the servo sectors 18, but also in the data tracks 20, 22, 24.

The method of the present invention for planarizing a disk with surface features of elevated lands and recessed grooves will be explained with FIGS. 3A-3C, which show sectional views of a DTM disk taken along a plane perpendicular to the discrete data tracks at various stages of the method. However, the method is fully applicable to any type of disk with surface features of elevated lands and recessed grooves, including a CM disk, a DTM disk, or a BPM disk, all of which may have servo sectors with such surfaces features.

Figure 3A:
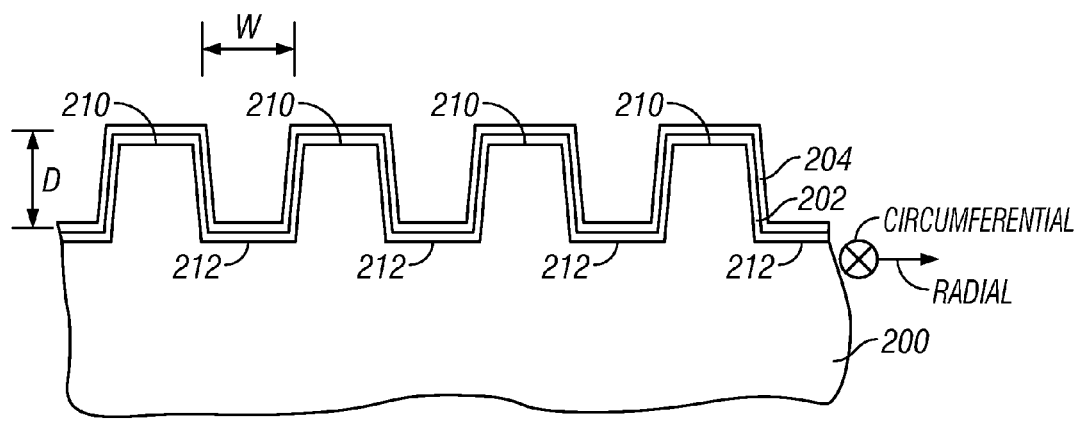
FIGS. 3A-3C are sectional views of a DTM disk taken along a plane perpendicular to the discrete data tracks at various stages of planarizing the disk according to the method of the present invention.

FIG. 3A shows a sectional view of disk substrate 200 with spaced-apart elevated lands 210 separated by recessed grooves 212. The substrate may be any conventional disk substrate, such as one formed of glass or silicon. A magnetic layer 202 is deposited on the substrate 200 over the land and groove surface features. The magnetic layer 202 may be a single layer or multilayer of any of the conventional ferromagnetic materials used for recording layers in magnetic recording disks, such as a cobalt-based alloy, for example a CoPtCr alloy. The materials of magnetic layer 202 may be selected to provide either for horizontal or perpendicular recording. The magnetic layer has a typical thickness in the range of about 30 to 100 nm. A protective overcoat 204 is deposited over the magnetic layer 202 for corrosion resistance and wear resistance from the slider. The protective overcoat 204 is typically formed of amorphous carbon, hydrogenated-carbon and/or nitrogenated-carbon and has a thickness in the range of about 1 to 5 nm. The lands 210 with magnetic layer 212 function as the data tracks and the grooves 212 function as the guard bands that separate the data tracks on the DTM disk. The lands 210 and grooves 212 are concentric rings aligned in the circumferential direction, as shown by the arrow tail in FIG. 3A, with the concentric grooves 212 being gaps between the lands that function to separate the concentric lands in the radial direction, as shown by the arrow in FIG. 3A. For the grooves 212, the typical gap depth "D", which is also the height of the lands, is in the range of about 10 to 50 nm and the typical gap width "W" is in the range of about 10 to 50 nm.

Figure 3B:
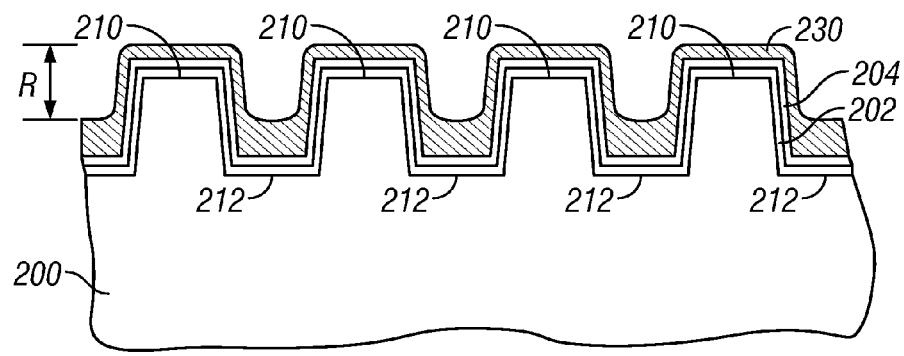

FIG. 3B shows the DTM disk after application and curing of a functionalized perfluorinated polyether (PFPE) polymer to form a first coating 230. The functionalized-PFPE is applied by dipping the disk into a solution of the functionalized-PFPE in a suitable solvent and then evaporating the solvent. A PFPE polymer includes fluorinated oligomers, homopolymers and copolymers of polyethers. Suitable functionalized-PFPEs for use as the first coating 230 include commercially available highly functionalized polar PFPEs such as Fomblin® Z-Tetraol, Fomblin® Z-Dol TX (Solvay Solexis, Sp.A., Italy) with polar hydroxyl (OH) end groups, plus other highly functionalized polar derivatives of PFPEs. Suitable functionalized-PFPEs also include non-functionalized polar PFPEs that are purchased and functionalized prior to use. These include PFPEs such as those sold under the brand names Krytox® (DuPont Specialty Chemicals, Deepwater, N.J.), Demnum® (Daikin Kogyo Co., Ltd., Japan), and other PFPEs sold under the Fomblin® Z name. The functionalized-PFPE should have active functional end groups that can interact with the carbon in the protective overcoat 204 as well as with each other to form a strong bulk inside the grooves 212. A preferred functionalized-PFPE is Fomblin® Z type with acrylate functional end groups, like that described in the previously-cited U.S. Pat. No. 6,680,079 B2, that can be cross-linked via exposure to ultraviolet (UV) radiation. Suitable solvents for the functionalized-PFPE include hydrofluoroethers (HFEs). Examples of HFEs include, mono-, di-, tri-, and poly-alkoxy-substituted perfluoroalkanes and a-, a-, and -substituted hydrofluoroalkyl ethers. Specific examples include the hydrofluoroether, methoxynonafluorobutane, and isomeric mixtures thereof. A preferred HFE solvent is HFE7100, commercially available from 3M. Another solvent, Vertrel XF from DuPont may also be used. The functionalized-PFPE with acrylate end groups is dissolved in the HFE in a ratio of about 1 to 100 by volume. The disk was soaked in the solution for 5 minutes and then the liquid functionalized-PFPE with acrylate end groups was exposed to UV radiation for 3 minutes. FIG. 3B shows that after curing substantial shrinkage of coating 230 has occurred, resulting in significant recession "R" of the coating 230 in the grooves 212, where R is a measure of the variation in surface topography of the coating 230 between the lands and grooves. The actual amount of recession depends strongly on D and W (see FIG. 3A). It has been determined experimentally that if D is about 80 nm to 100 nm and W is about 40 nm, then R is about 25 nm.

In an attempt to improve the planarization of the disk, a second coating of functionalized-PFPE with functional acrylate end groups was applied and cured in the same manner to form a second coating over coating 230. However, this resulted in dewetting of the coating which led to undesirable accumulations of the coating material at the edges between the lands and grooves. Such accumulation causes additional undesirable surface topography variations.

Figure 3C:
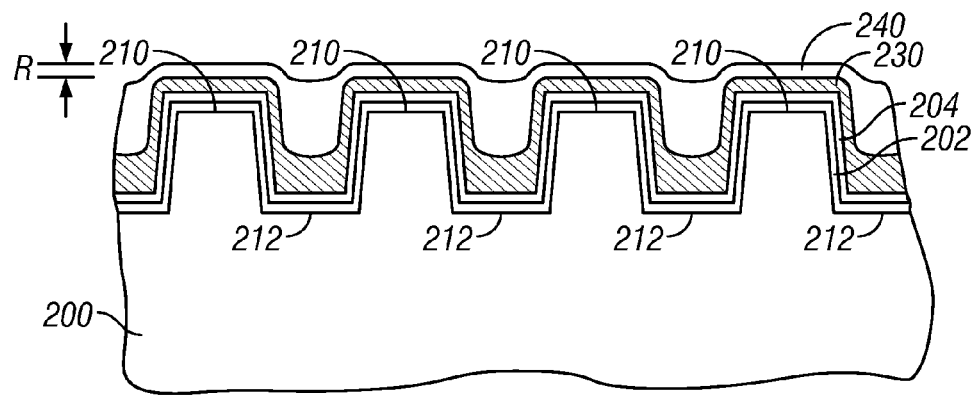

FIG. 3C shows the DTM disk after application and curing of a second coating 240 over first coating 230 according to the method of the present invention. The second coating 240 is a non-functionalized-PFPE. The non-functionalized-PFPE is preferably a non-functionalized polar PFPE with high molecular weight (greater than about 70,000) for increased viscosity and resistance to spin-off during rotation of the disk. A preferred non-functionalized-PFPE is Fomblin® Z. Fomblin® Z has the structure:

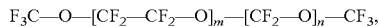

where m and n are about 4 or 5, and is synthesized by photo-oxidation of tetrafluoroethylene and is a linear, random copolymer of ethylene oxide and methylene oxide units. Other non-functionalized-PFPEs include PFPEs such as those sold under the brand names Krytox® (DuPont Specialty Chemicals, Deepwater, N.J.), Demnum® (Daikin Kogyo Co., Ltd., Japan), and other PFPEs sold under the Fomblin® Z name. The non-functionalized-PFPE is dissolved in the HFE in a ratio of about 2 to 100 by volume. The disk with coating 230 was then soaked in the solution for 5 minutes and then the liquid non-functionalized-PFPE was exposed to UV radiation for 3 minutes. FIG. 3C shows that after curing the recession R of the coating 240 in the grooves 212 is substantially less than the recession for coating 230 alone (FIG. 3B). The desired result is that the combined thickness of coatings 230 and 240 on the lands 210 is about 1.5 nm and the recession R is less than about 4 nm.

The functionalized-PFPE is applied first so that after curing, the functionalized-PFPE polymer is strongly cross-linked with the active functional end groups bonded with the carbon overcoat, resulting in a solid three-dimensional network.

Figure 4:
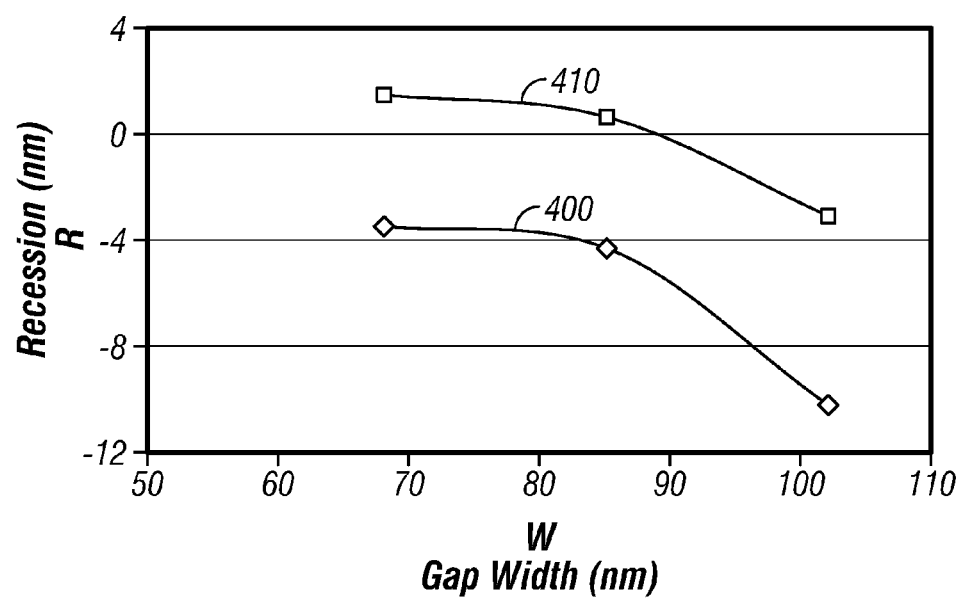
FIG. 4 is a graph of experimental results showing recession R of the coating above the grooves from the coating above the lands as a function groove gap width W for a disk with groove gap depth D kept constant at about 30 nm.

FIG. 4 is a graph of experimental results showing recession R as a function gap width W for a disk with gap depth D kept constant at about 30 nm. Curve 400 shows recession after curing of the functionalized-PFPE with acrylate end groups to form coating 230. Curve 410 shows recession after curing of the non-functionalized-PFPE to form coating 240 on top of coating 230. The curves show a reduction in recession of about 6 nm for a gap width of about 100 nm. The improvement would be even greater for gap depths greater than 30 nm.

As an optional step in the method of the present invention, the disk can be subjected to a well-known tape burnishing or wiping process. The disk is rotated in contact with a 3 mm×5 mm cloth pad, a process also referred to as final tape clean (FTC). This tape burnishing process is used to remove excess accumulation of the functionalized-PFPE on top of the lands. It may be performed before or after curing of the functionalized-PFPE. The mechanical contact will result in a reduction of thickness of the functionalized-PFPE on top of the lands, without disturbing the functionalized-PFPE in the grooves.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
   a substrate having a plurality of elevated lands and recessed grooves;
   a magnetic recording layer on the elevated lands;
   a carbon-containing protective overcoat on the magnetic recording layer and recessed grooves, the recessed grooves having a gap width W, the gap depth D from the top of the overcoat on the lands to the top of the overcoat on the recessed grooves being equal to or greater than 30 nm; and
   a coating on the overcoat on the lands and in the recessed grooves and comprising:
      a cross-linked functionalized-perfluorinated polyether (PFPE) layer having functional end groups bonded to the carbon-containing overcoat and a recession R1 between the top of said functionalized-PFPE layer on the lands and the top of said functionalized-PFPE layer in the recessed grooves, where a negative value of R1 is measured in the direction from the top of said functionalized-PFPE layer on the lands toward the substrate; and
      a cross-linked non-functionalized-PFPE layer on the functionalized-PFPE layer, wherein the recession between the top of said non-functionalized-PFPE layer on the lands and the top of said non-functionalized-PFPE layer in the recessed grooves is R2, where a negative value of R2 is measured in the direction from the top of said non-functionalized-PFPE layer on the lands toward the substrate;
      wherein for a D of 30 nm or greater than 30 nm, the recession improvement (R1-R2) is equal to minus 5 nm or more negative than minus 5 nm for a W between about 70 nm and 100 nm.

2. The disk of claim 1 wherein the functionalized-PFPE contains end groups selected from hydroxyl end groups and acrylate end groups.

3. The disk of claim 1 wherein the disk is a discrete track disk and wherein the lands comprise radially-spaced concentric tracks and the grooves comprise radially-spaced guard bands.

4. The disk of claim 1 wherein the disk is a patterned-media disk and wherein the lands comprise discrete data islands and the grooves comprise regions between the data islands.

5. The disk of claim 1 wherein the lands comprise generally radially-directed servo blocks and the grooves comprise regions between the servo blocks.

* * * * *